Patented June 12, 1951

2,556,917

UNITED STATES PATENT OFFICE 2,556,917

PRODUCTION OF LYSINE MONOHYDROCHLORIDE AND DERIVATIVES

Kenneth O. Hambrock, Niagara Falls, N. Y., assignor to E. I. du Pont de Nemours and Company, Wilmington, Del., a corporation of Delaware No Drawing. Application March 9, 1950, Serial No. 148,737

2 Claims. (Cl. 260—534)

This invention relates to the production of piezoelectric crystals and has for its object the production of a novel crystalline material having piezoelectric properties.

The new piezoelectric material produced according to the present invention is lysine monohydrochloride dihydrate in an optically active form. The chemical formula for this material is $H_2N(CH_2)_4CH(NH_2)COOH \cdot HCl \cdot 2H_2O$.

Lysine is one of the amino acids which can be obtained by hydrolysis of proteins or by synthetic processes and is believed to be an essential element in nutrition. Lysine occurs in two optically active forms; l(+)-lysine which rotates polarized light to the right and d(—)-lysine which rotates polarized light to the left. Optically inactive lysine, usually designated as dl-lysine, does not rotate polarized light. Any one of the three forms of the amino acid may be prepared either as the free amino acid, as the monohydrochloride or as the dihydrochloride. The lysine monohydrochlorides are water soluble and generally are obtained from the water solution by adding thereto a water miscible organic solvent such as methanol or ethanol which causes crystallization or precipitation of the crystalline lysine monohydrochloride. The lysine monohydrochloride so produced is a very finely divided, crystalline material, substantially in powder form and is anhydrous, that is, it contains no water of hydration.

In the preparation of lysine, particularly by synthetic methods, it is usually produced in the dl form. The dl form can be resolved by conventional methods to convert it into the l(+) and d(—) varieties.

I have discovered that by crystallizing an optically active form of lysine monohydrochloride from an aqueous solution which is substantially free from any water miscible organic solvent, the crystalline dihydrate corresponding to the formula given above is obtained, which has good piezoelectric properties. I have further discovered that crystallization of dl-lysine monohydrochloride in the same manner from its aqueous solution yields the characteristically finely divided anhydrous dl-lysine monochloride crystals. Under identical crystallization conditions the optically active lysine monohydrochloride dihydrate crystals produced are many times larger than those of the anhydrous dl-lysine monohydrochloride and from a mixture the two can be separated to a large extent by mechanical methods such as screening, that is by passing the material through a sieve or screen of such mesh size that the larger crystals of the optically active dihydrate are retained while the smaller crystals of the dl form pass through the sieve.

I have further found that if an equimolar mixture of d(—)-lysine and l(+)-lysine existing in solution in the form of the monohydrochlorides is crystallized from that solution without the aid of organic solvents, the product is the anhydrous dl-lysine monohydrochloride crystals. However, if either of the two optically active isomers is in excess, that excess will crystallize out as the relatively large-sized lysine monohydrochloride dihydrate crystals, while the remainder will crystallize out as the anhydrous dl-lysine monohydrochloride. The two forms of crystals may then be mechanically separated as above described.

To prepare the optically active lysine monohydrochloride dihydrate crystals, particularly for piezoelectric use, I prefer to crystallize the material from an aqueous solution of the optically active isomer in a state of relatively high purity. Either the d(—)-lysine or the l(+)-lysine may be utilized. Generally it will be preferred to utilize the l(+)-lysine since, in addition to the piezoelectric properties of the crystals the l(+) form has nutritional value and individual crystals not suitable for piezoelectric use may if desired be utilized for nutritional purposes. The d(—) form does not have nutritional value.

The invention is further illustrated by the following examples:

Example 1

Lysine monohydrochloride (50 g.) containing by analysis 18.95% chloride ion and 96.3% of the l(+)-isomer, was dissolved in 40 g. of water at a temperature above 70° C. The solution was cooled slowly to 33° C. without crystallizing. When the container was then scratched, crystals precipitated rapidly and the temperature rose about 10°. After standing 3 hours, during which the temperature fell to 28° C., the mixture was filtered and the crystals air-dried 2 days. The product weighed 36.8 g. and contained 16.06% chloride. A sample of the material was dried overnight at 90° C., and lost 16.3% of its weight. The dehydrated product contained 19.14% chloride.

Example 2 d(—)-Lysine monohydrochloride (82 g.) was dissolved in 100 g. of water at about 35° C.; this proportion of lysine monohydrochloride and water form a saturated solution at about 28° C. The solution was seeded with a small crystal of hydrated d(—)-lysine monohydrochloride and let stand overnight undisturbed in a constant temperature room at 17° C. A number of transparent, well formed crystals were obtained, which measured 0.1 to 0.5 cm. in length.

*Example 3*

A crystal of l(+)-lysine monohydrochloride dihydrate produced as described in Example 2 was placed on a grounded foil electrode connected to the grounded side of an oscilloscope. A second foil electrode was placed on the opposite end of the crystal and connected to the vertical amplifier of the oscilloscope. After the electrodes were securely clamped, the heel of a vibrating tuning fork (440 C. P. S.) was applied to the crystal. Because of the piezoelectric nature of the crystal the vibrating tuning fork caused an alternating electric field to be produced at the electrodes and a corresponding pattern appeared on the screen of the cathode ray tube of the oscilloscope.

The amplitude of the pattern obtained with the lysine crystal was then compared with that obtained when a crystal of X-cut beta quartz, a commercially useful piezoelectric crystal, was substituted. The results indicated that the effect with the lysine monohydrochloride dihydrate crystal is of about the same magnitude as that with X-cut beta quartz.

The various conventional procedures for crystallizing salts from water may be employed to produce the crystalline lysine dihydrates, except that the temperature of the crystallizing solution must be regulated so that crystallization occurs at a temperature below 70° C. and the dihydrate crystals should not be subjected to heat above that temperature. When the crystallization is carried out at 70° or higher the only crystalline product obtained is the finely divided anhydrous product, which has no value for piezoelectric purposes. At temperatures below 70° C. the dihydrate crystals, if allowed to stand in dry air are slowly converted to the anhydrous form. Generally, from several days to several months of exposure to dry air is required to completely dehydrate the crystals, depending on the size of crystal, the temperature and the moisture content of the air. However, the dihydrate crystals are perfectly stable if maintained in a suitably moist atmosphere and in using them in piezoelectric devices they are preferably maintained in an inclosed space, the atmosphere of which is saturated with water vapor; or the crystals may be covered with a coating which is impermeable to water vapor.

In addition to providing a means for making piezoelectric crystals, the present invention affords a means for purifying optically active lysine. For example, an aqueous solution of l(+)-lysine monohydrochloride containing a minor amount of d(—)-lysine monohydrochloride may be subjected to crystallization as above described. The resulting crystalline product will be a mixture of finely divided anhydrous dl-lysine monohydrochloride crystals and l(+)-lysine monohydrochloride dihydrate crystals of much larger size. After removing the crystals from the mother liquor and drying, the crystals are fed to an agitated screen of such mesh size that the larger dihydrate crystals are retained, while the small anhydrous crystals of the dl form pass through. The crystals retained on the screen are l(+)-lysine monochloride in a high state of purity. Insofar as any broken fragments of the dihydrate crystals are formed and pass through the screen, the material passing through the screen may be recycled to be recrystallized. The invention is not restricted to screening to separate the two forms, but other conventional sizing methods may be employed for separating the large and small crystals. The same method may be employed to produce a pure grade of d(—)-lysine, or to produce dl-lysine containing little or none of either optically active form.

I claim:

1. The process which comprises crystallizing lysine monohydrochloride at a temperature below 70° C. from an aqueous solution containing unequal quantities of the two optical isomers l(+)-lysine monohydrochloride and d(—)-lysine monohydrochloride, separating the resulting crystals from the solution and separating the resulting crystals of anhydrous dl-lysine monohydrochloride from the larger crystals of the dihydrate of the optically active lysine monohydrochloride originally present in predominating proportion.

2. The process which comprises crystallizing lysine monohydrochloride at a temperature below 70° C. from an aqueous solution containing l(+)-lysine monohydrochloride and a smaller amount of d(—)-lysine monohydrochloride, separating the resulting crystals from the solution and screening to separate the crystals of anhydrous dl-lysine monohydrochloride from the larger crystals of l(+)-lysine monochloride dihydrate.

KENNETH O. HAMBROCK.

REFERENCES CITED

The following references are of record in the file of this patent:

Dunn et al.: "Advances in Protein Chemistry," edited by Anson et al. (Academic Press), vol. 3, p. 343 (1947).